United States Patent [19]

Suzuki et al.

[11] Patent Number: 5,450,162
[45] Date of Patent: Sep. 12, 1995

[54] PHOTO-TAKING APPARATUS CAPABLE OF MAKING A PHOTOGRAPH WITH FLASH BY A FLASH DEVICE

[75] Inventors: Shinichi Suzuki, Tokyo; Seiichi Yasukawa, Kawasaki; Toshihiro Sato, Yokohama; Tsutomu Narisawa, Saitama, all of Japan

[73] Assignee: Nikon Corporation, Tokyo, Japan

[21] Appl. No.: 277,947

[22] Filed: Jul. 19, 1994

Related U.S. Application Data

[60] Continuation of Ser. No. 135,616, Oct. 14, 1993, abandoned, which is a division of Ser. No. 827,719, Jan. 29, 1992, Pat. No. 5,305,048.

[30] Foreign Application Priority Data

Feb. 12, 1991 [JP] Japan .................................. 3-40923

[51] Int. Cl.⁶ .............................................. G03B 15/05
[52] U.S. Cl. .................................................. 354/416
[58] Field of Search ............................... 354/416, 417

[56] References Cited

U.S. PATENT DOCUMENTS 4,494,850  1/1985  Katsuma et al. ............... 354/416
4,527,880  7/1985  Okino ........................... 354/417 X Primary Examiner—W. B. Perkey
Attorney, Agent, or Firm—Shapiro and Shapiro

[57] ABSTRACT

A flash modulation control apparatus in a camera having a photo-taking lens and a flash device mounted thereon comprises a photographing mode setting device for setting a photographing mode in which optimal exposure is obtained in conformity with an object, a divisional photometry device for dividing the object field into a plurality of areas, metering through the photo-taking lens light emitted from the flash device and reflected by the object, and outputting photometric values, a weighting device for determining an amount of weighting for each of the photometry areas of the divisional photometry device in conformity with the photographing mode set by the photographing mode setting device, and weighting each of the photometric values on the basis of the amount of weighting, and a light modulation control device for stopping the light emission of the flash device when the sum total of the weighted photometric values reaches a predetermined level.

6 Claims, 9 Drawing Sheets

PHOTO-TAKING APPARATUS CAPABLE OF MAKING A PHOTOGRAPH WITH FLASH BY A FLASH DEVICE

This is a continuation of application Ser. No. 08/135,616 filed Oct. 14, 1993 (now abandoned), which is a division of application Ser. No. 07/827,719 filed Jan. 29, 1992, now U.S. Pat. No. 5,305,048, issued Apr. 19, 1994.

BACKGROUND OF THE INVENTION

1. Field of the Invention

This invention relates to a flash modulation control apparatus in a camera of the TTL automatic light modulation type, and particularly an apparatus for setting a photographing mode in conformity with an object, and effecting light modulation control in accordance with the photometry area and light amount level of the object field optimal to the photographing mode.

2. Related Background Art

There is known a flash modulation control apparatus in a camera of the TTL automatic light modulation type which effects light modulation so that after the light emission of a flash device is started during flash photographing, the light emission of the flash device may be stopped when the amount of reflected light from an object reaches a predetermined light amount level, whereby proper exposure may be obtained.

The photometry area of the apparatus of this kind is substantially the whole of the photographing image field, or a relatively wide range including the center of the image field. Also, the light amount level which determines the timing of the stoppage of the light emission is determined on the basis of light reflected at a predetermined proportion relative to a certain predetermined amount of light emitted. For example, an object having a certain predetermined reflectivity (average reflectivity) is disposed in opposed relationship with the flash device so as to cover an area for effecting photometry, and a TTL light amount level is determined on the basis of such a relation between time and light amount that the object is photographed at proper exposure during flash emission.

However, the reflectivity of the object field during ordinary flash photographing is not uniform and therefore, when flash photographing is effected by the use of a conventional device, there arises the problem that exposure becomes over or under depending on the object.

For example, if the number of persons or bodies which are main objects increases or decreases, the area that main objects lying at the same distance occupy for the photometry area in the photographing image field varies and the amounts of reflected light from these main objects vary. However, the amount of light emitted from the flash device is controlled on the basis of a TTL light amount level determined with an object of the average reflectivity supposed and therefore, if the number of main objects increases, the amount of reflected light increases and light emission is stopped early and thus, the exposure for the main objects becomes under. If conversely, the number of main objects decreases, the amount of reflected light decreases and the time when light emission is stopped becomes late, and the exposure for the main objects becomes over. A similar phenomenon occurs when lenses of different focal lengths are used. That is, if the focal length becomes smaller (if a wide angle lens is used), the size of the main object in the photographing image field becomes smaller and the background range photographed becomes wider and therefore, the amount of reflected light from the main object decreases and the time when light emission is stopped becomes late, and the exposure for the main object becomes over. On the other hand, if the focal length becomes greater (if a telephoto lens is used), the size of the main object in the photographing image field becomes larger and the background range photographed becomes narrower and therefore, the amount of reflected light from the main object increases and the time when light emission is stopped becomes early, and the exposure for the main object becomes under.

Also, in the prior-art apparatus, reflected light from an object is metered in the whole of the photographing image field or a wide range including the central portion of the image field, and this also leads to the problem that proper exposure is not obtained for a main object when the main object occupies a relatively narrow range in the photographing image field or when the main object is not at the center of the image field.

SUMMARY OF THE INVENTION

It is the object of the present invention to provide a flash modulation control apparatus in a camera for setting a photographing mode in conformity with an object, and effecting the light modulation control of a flash device in accordance with the photometry area and light amount level of the object field optimal to the photographing mode, thereby obtaining optimal exposure in conformity with the object.

DESCRIPTION OF THE PREFERRED EMBODIMENTS

Figure 1:
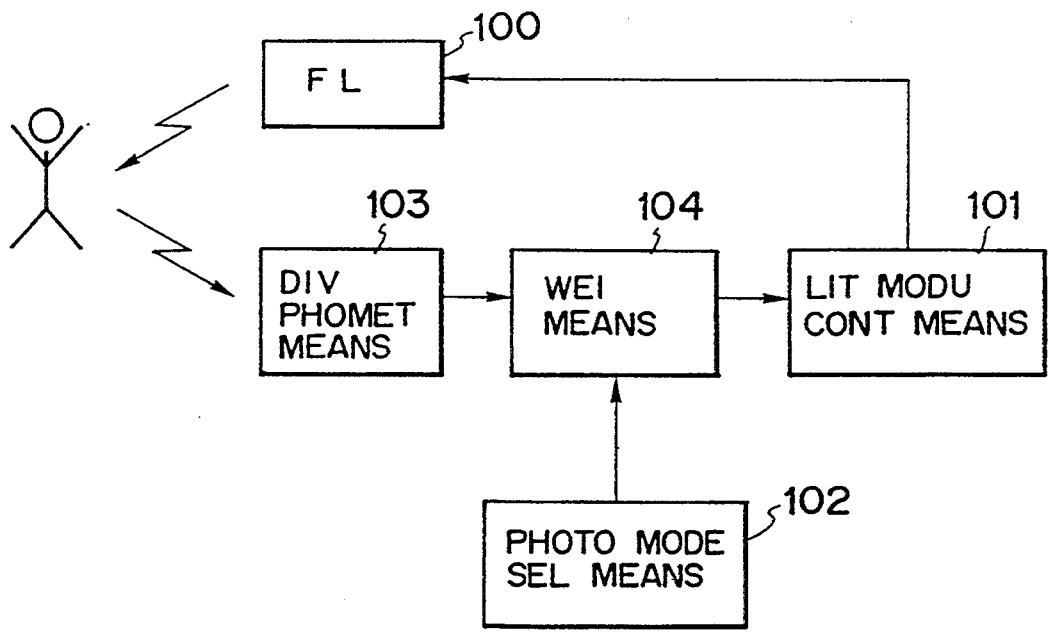
FIG. 1 shows an embodiment of the present invention.

In the present invention, as shown in FIG. 1, weighting means 104 effects weighting to each photometry area of divisional photometry means 103 in conformity with a photographing mode set by photographing mode setting means 102, and outputs the photometric value of each weighted photometry area. Light modulation control means 101 effects the light modulation control of a flash device 100 on the basis of the photometric value of each weighted photometry area.

Figure 2:
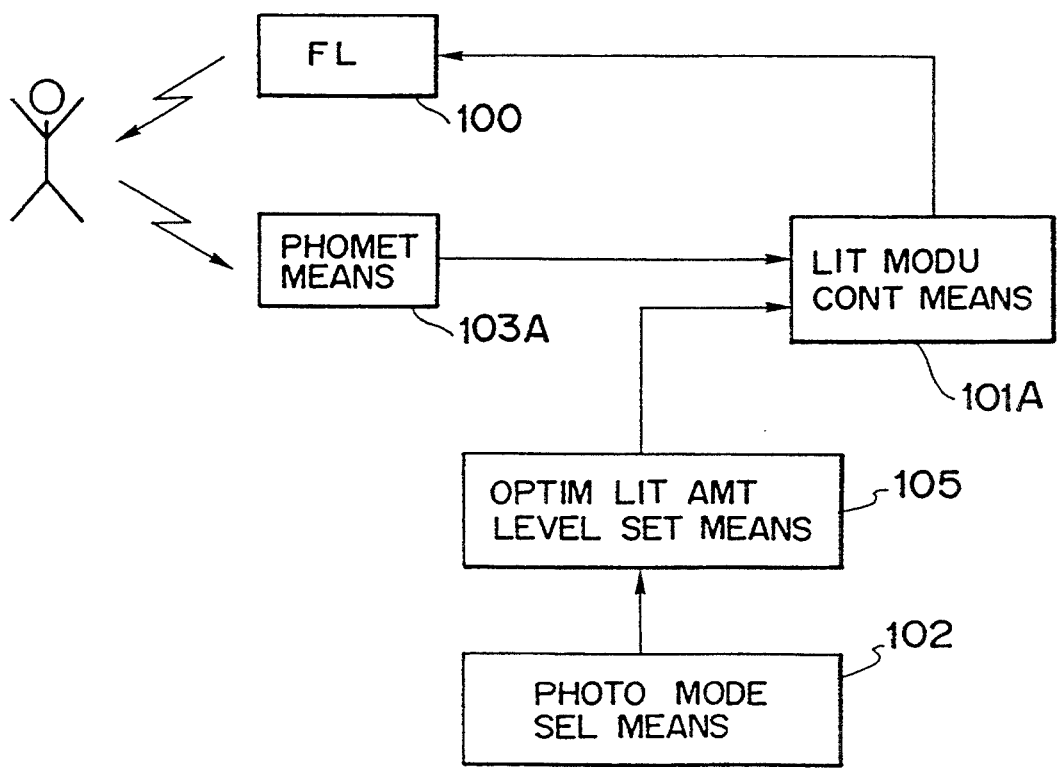
FIG. 2 shows another embodiment of the present invention.

In the present invention, as shown in FIG. 2, optimal light amount level setting means 105 sets an optimal light amount level in conformity with a photographing mode set by photographing mode setting means 102, and light modulation control means 101A stops the light emission of a flash device 100 when the photometric value of photometry means 103A reaches the optimal light amount level.

Figure 3:
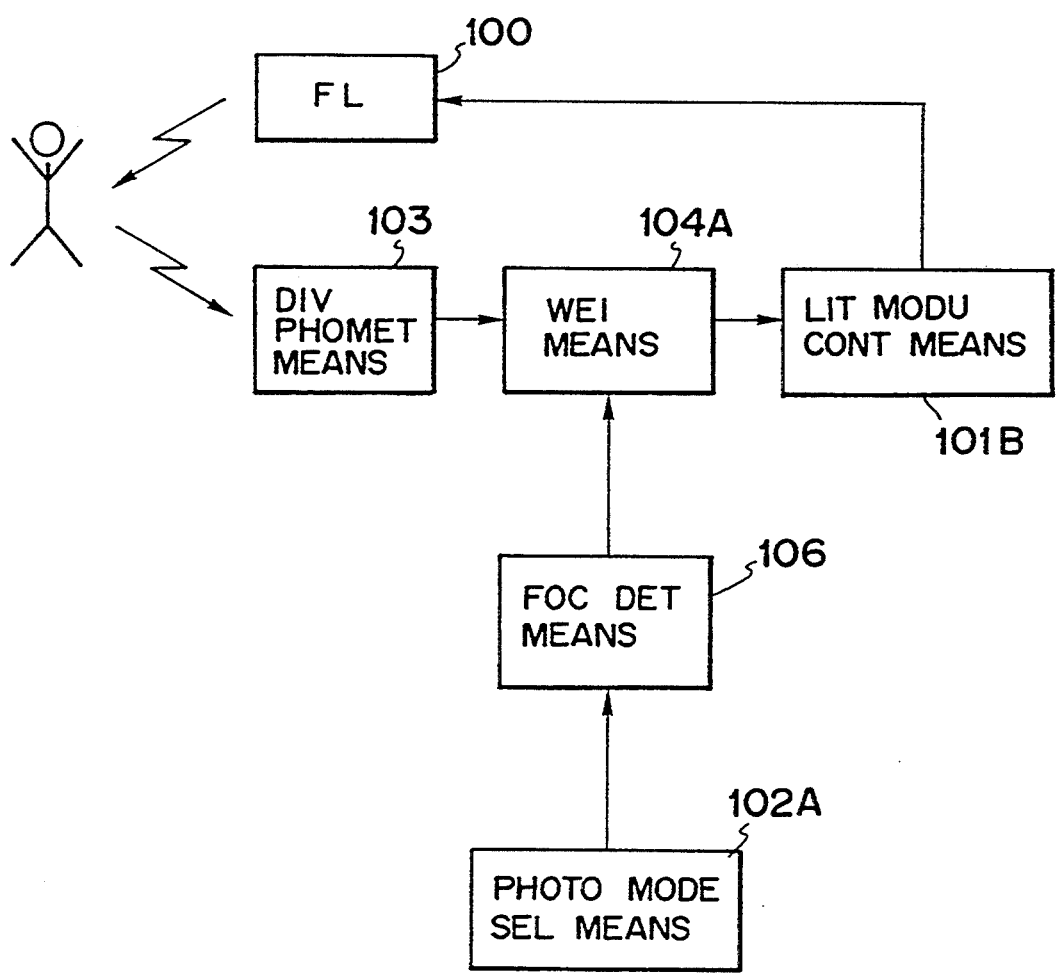
FIG. 3 shows still another embodiment of the present invention.

In the present invention, as shown in FIG. 3, weighting means 104A effects weighting to each photometry area of divisional photometry means 103 on the basis of the result of the focus detection by focus detecting means 106 when a photographing mode for effecting light modulation control in response to the focus detecting means 106 is set by photographing mode setting means 102A, and outputs the photometric value of each weighted photometry area. Light modulation control means 101B effects the light modulation control of a flash devcie 100 on the basis of the photometric value of each weighted photometry area.

Some embodiments of the present invention will hereinafter be described with reference to the drawings.

Figure 4:
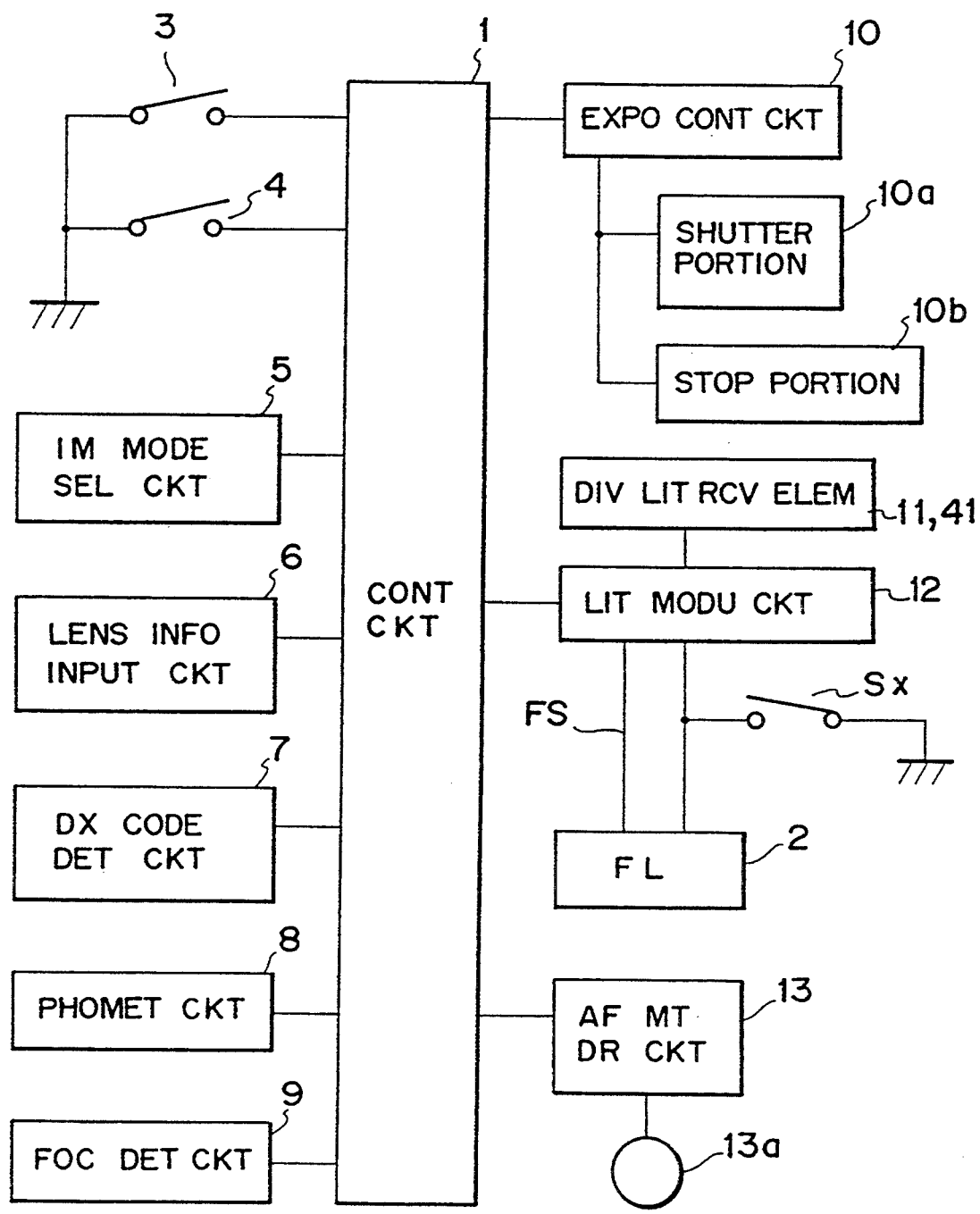
FIG. 4 is a block diagram showing the construction of an embodiment of the present invention.

FIG. 4 is a block diagram showing the construction of an embodiment.

In FIG. 4, the reference numeral 1 designates a control circuit comprised of a microcomputer and various parts around it. The control circuit 1 executes a control program which will be described later and effects the light modulation control of a flash device 2 and also controls the various operations of a camera. The reference numeral 3 denotes a switch adapted to be closed when a shutter release button, not shown, is half-pushed, and the reference numeral 4 designates a switch adapted to be closed when the shutter release button is fully pushed. The reference numeral 5 denotes an image mode selecting circuit for selecting image modes such as a fantasy mode, a wedding mode and a balance synchro spot mode which will be described later. The image mode selecting circuit 5 selects photographing conditions so that a photograph as per the photographer's intention may be obtained. The reference numeral 6 designates a lens information input circuit which receives as an input the information of the fully open F value, the focal length, the exit pupil, etc. of a photo-taking lens from a lens ROM, not shown, which is provided in a photo-taking lens barrel. The reference numeral 7 denotes a DX code detecting circuit for detecting film speed information recorded on a film cartridge, the reference numeral 8 designates a photometry circuit for metering the interior of the photographing image field and outputting brightness information, the reference numeral 9 denotes a focus detecting circuit for detecting the focus adjusted state of the photo-taking lens, and the reference numeral 10 designates an exposure control circuit for driving a shutter portion 10a and a stop portion 10b.

Figure 5:
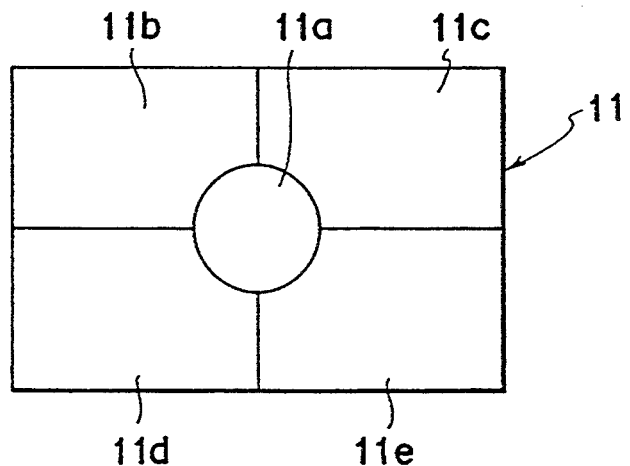
FIG. 5 shows the divided areas of a divisional light receiving element.

The reference numeral 11 denotes a divisional light receiving element for receiving light emitted from the flash device 2 and reflected by an object. The divisional light receiving element divides the interior of the photographing image field into five areas as shown in FIG. 5, and outputs the photometric value of each of these areas. The reference numeral 12 designates a light modulation circuit for effecting the flash modulation control of the flash device. The light modulation circuit 12 outputs a light emission stopping signal FS for stopping the light emission of the flash device 2 when the integrated value of the photometric value from the divisional light receiving element 11 reaches a predetermined value. Sx denotes a syncro contact adapted to be closed when the shutter is fully opened and start the light emission of the flash device 2, and the reference numeral 13 designates an AF motor driving circuit for driving an auto focus (hereinafter called AF) motor 13a.

Figure 6:
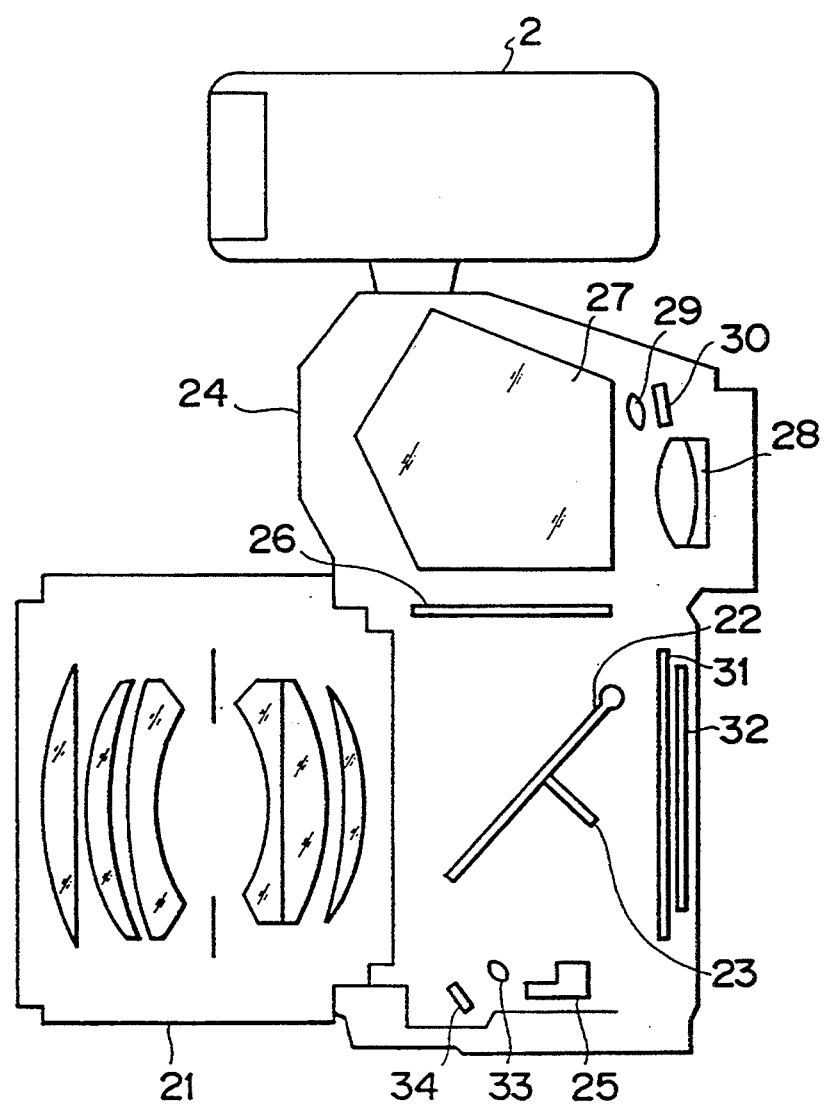
FIG. 6 is a cross-sectional view of a camera equipped with the flash modulation control apparatus of the present invention.

FIG. 6 is a cross-sectional view of a camera schematically showing a flash modulation system.

A light beam from the object passes through a photo-taking lens barrel 21 to a main mirror 22. A part of the light beam passes through the main mirror 22, is reflected by a sub-mirror 23 and is directed to a focus detecting portion 25 provided at the bottom of the camera 24. The focus detecting portion 25 is comprised of a focus detecting optical system and the focus detecting circuit 9 which is shown in FIG. 4, and detects the focus adjusted state of the photo-taking lens on the basis of the light beam from the object. On the other hand, part of the light beam from the object which is reflected by the main mirror 22 is observed by the photographer through a focusing screen 26, a pentaprism 27 and an eyepiece 28 and also is directed to a photometry portion 30 through a condenser lens 29. The photometry portion 30 is comprised of a photoelectric conversion element for dividing the interior of the photographing image field into a plurality of photometry areas and metering them and the photometry circuit 8 shown in FIG. 4, and outputs the brightness information of each photometry area.

When the shutter is released during flash photographing, the main mirror 22 and the sub-mirror 23 are retracted out of the photographing optical path and the shutter 31 is fully opened. At this time, the light emitted from the flash device 2 and reflected by the object, i.e., natural light plus reflected light of the flash is directed to film 32 through the photo-taking lens barrel 21 and further, some of the light is reflected by the surface of the film 32 and is directed to a light modulating portion 34 through a condenser lens 33. The light modulating portion 34 is comprised of the divisional light receiving element 11 and light modulation circuit 12 shown in FIG. 5 and described above, and effects the flash modulation control of the flash device 2.

Figure 7:
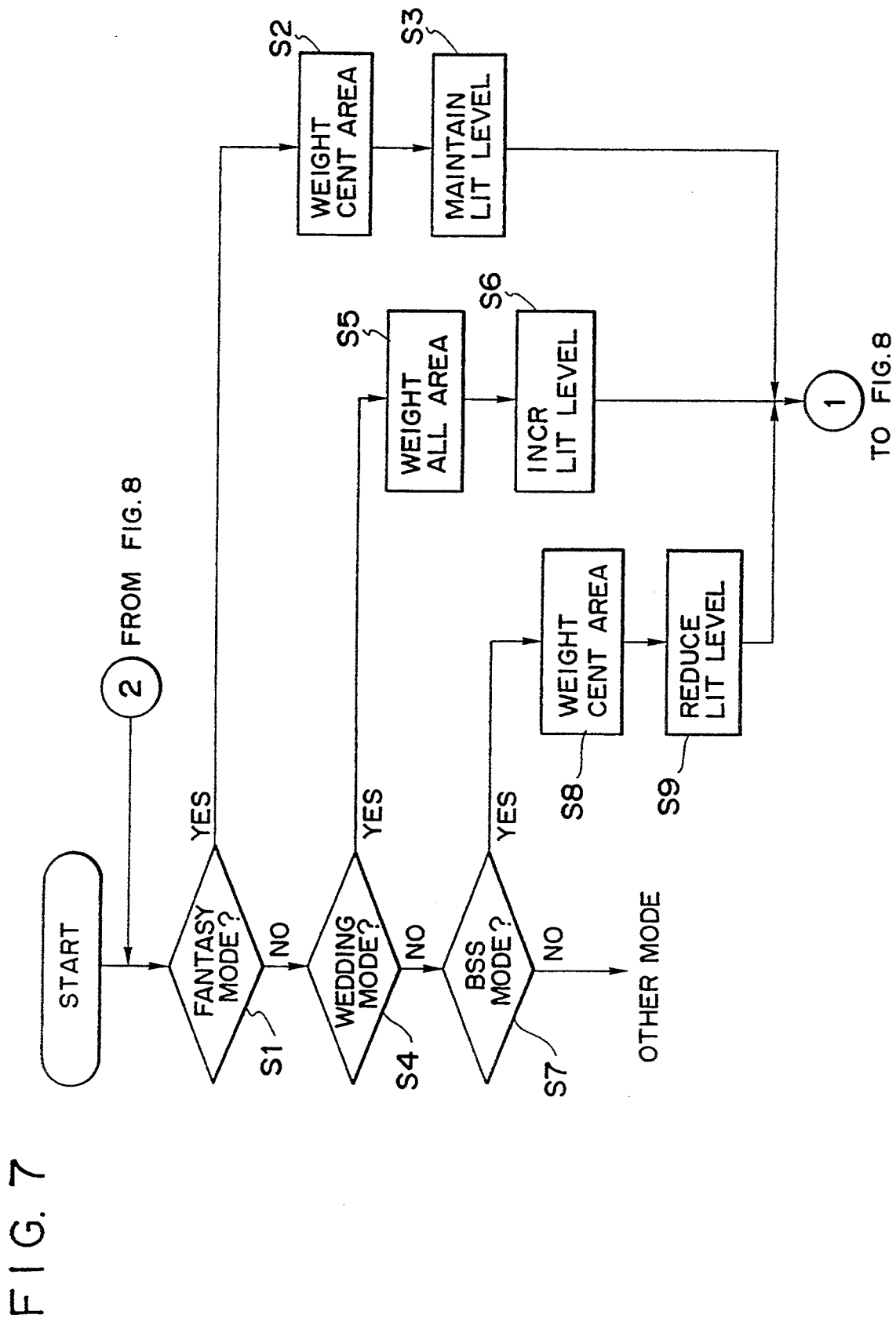
FIG. 7 is a flow chart showing the light modulation control program of said embodiment.
Figure 8:
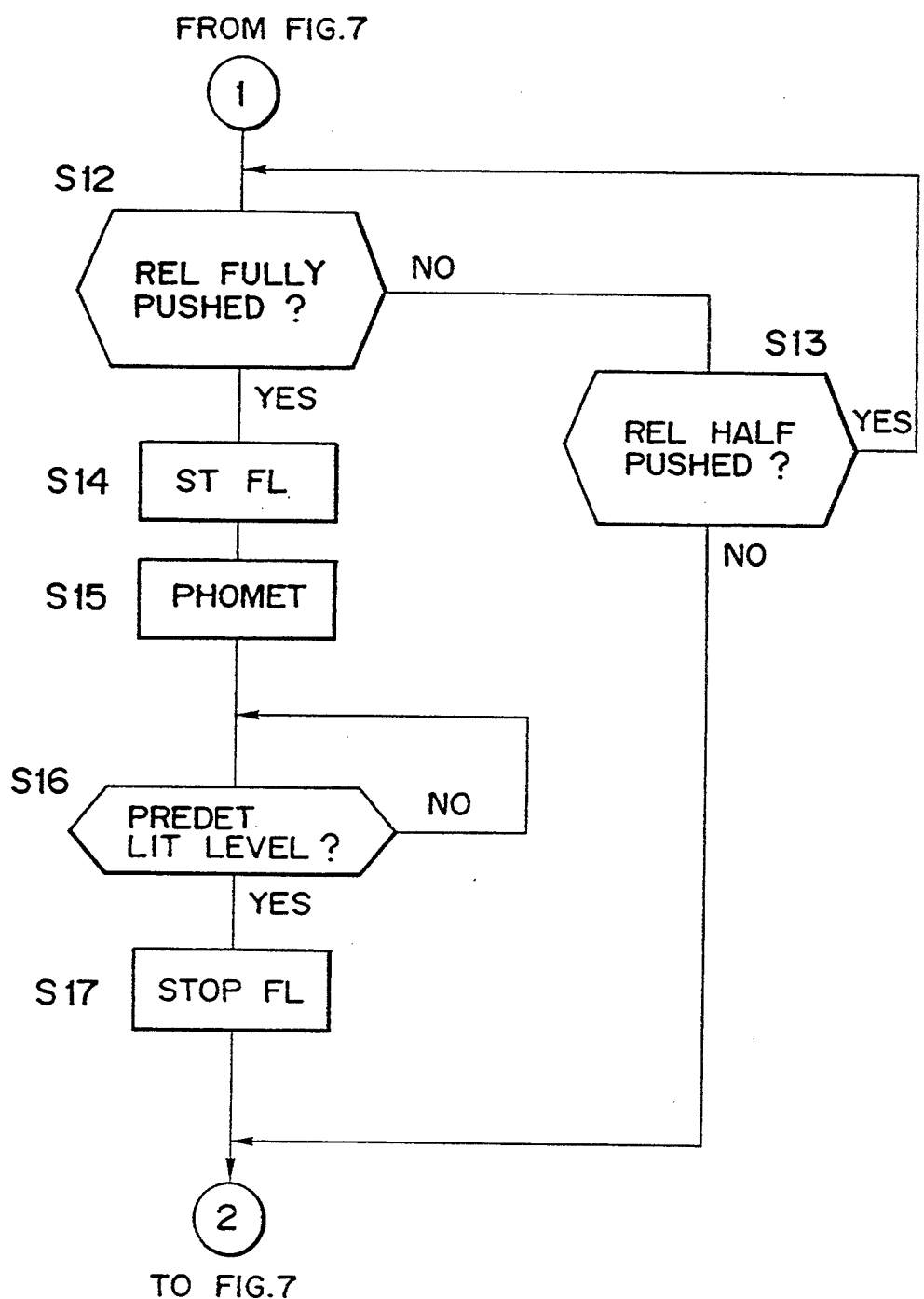
FIG. 8 is a flow chart showing the light modulation control program of said embodiment.

FIGS. 7 and 8 show a control program executed by the control circuit 1. The control circuit 1 begins to execute this program when the main switch of a camera, not shown, is closed. With reference to these figures, the operation of the flash modulation control apparatus will now be described with image modes such as a fantasy mode, a wedding mode and a balance synchro spot mode taken as examples.

At a step S1, whether the fantasy mode is selected by the image mode selecting circuit 5 is discriminated, and if it is selected, advance is made to a step S2. The fantasy mode is a photographing method whereby the shutter is released with the photo-taking lens focused on the object and exposure is effected for a predetermined time, whereafter the photo-taking lens is driven at a high speed and exposure is continued with the photo-taking lens brought out of focus. According to this photographing method, an image which is out of focus is superposed on an image which is in focus, and an object image which is in focus is obtained in the central portion of the photographing image field and the defocus amount becomes greater toward the marginal portion of the photographing image field and therefore, the object image is blurred. That is, the effect of zoom during exposure is obtained. Accordingly, when this fantasy mode is selected, the main object is considered to be at the center of the photographing image field, and at the step S2, the central area of the divisional light receiving element 11 shown in FIG. 5 is set as a photometry area. That is, a weight of 1.0 is set to the central area and a weight of 0 is set to the marginal areas, and weighting is effected to the photometric values of the respective areas. If this is done, more proper exposure is obtained for the main object lying in the central area than when light modulation is effected on the basis of the photometric value of the entire photographing image field. Subsequently, at a step S3, a TTL light amount level is set, but during the photographing by this fantasy mode, a predetermined standard light amount level is adopted and no correction is done. Of course, correction may be done in conformity with the photographing situation. After the photometry area and TTL light amount level of the fantasy mode have been set, advance is made to the step S12 of FIG. 8.

When the step S1 is negated, advance is made to a step S4, where whether the wedding mode is selected is discriminated, and if it is selected, advance is made to a step S5. In a wedding or the like, it is often the case that objects of high reflectivity such as a gold-leafed folding screen and a wedding cake are placed near the main object, and flash is intensely reflected by these objects of high reflectivity, and if ordinary light modulation is effected, flash is stopped early because the amount of reflected light is great. That is, under-exposure is brought about for the main object. In order to avoid such an inconvenience, in the wedding mode, the predetermined standard TTL light amount level is corrected for increase, and flash photographing is effected so that the exposure for the main object may become proper. During the photographing by this wedding mode, at what position in the photographing image field the main object is cannot be specified and therefore, at the step S5, all areas of the divisional light receiving element 11 are set as photometry areas, and a weight of 1.0 is set therefor and light modulation control is effected. Subsequently, at a step S6, the predetermined standard TTL light amount level is corrected for plus as described above. After the photometry areas and TTL light amount level of the wedding mode have been set, advance is made to the step S12 of FIG. 8.

If the step S4 is negated, advance is made to a step S7, where whether the balance synchro spot mode is selected is discriminated, and if it is selected, advance is made to a step S8. The balance synchro spot mode is a flash photographing method which takes the harmony of the main object and the background into account. That is, when the main object is at the center of the photographing image field, according to the conventional flash photographing method, the main object becomes properly exposed, while the background portion the flash does not reach becomes under-exposed and thus, there results an unnatural photograph in which only the main object is relieved. In order to avoid such an inconvenience, in the balance synchro spot mode, light emission is stopped earlier than usual and the exposure of the main object is made somewhat under to thereby adjust the balance with the background. During the photographing by this balance synchro spot mode, at the step S8, a weight of 1.0 is set at central area of the photographing image field and a weight of 0 is set at the marginal area of the photographing image field, and light modulation control is effected. Further, at a step S9, as described above, the TTL light amount level is corrected for minus. After the photometry area and TTL light amount level of the balance synchro spot mode have been set, advance is made to the step S12 of FIG. 8. If the step S7 is negated, advance is made to the process routine of other image mode. The description of the other image mode is omitted herein.

At the step S12 of FIG. 8, whether the shutter release button is fully pushed is discriminated by means of the switch 4, and if it is fully pushed, advance is made to a step S14, and if not so, advance is made to a step S13. At the step S13, whether the shutter release button is half-pushed is discriminated by means of the switch 3, and if it is half-pushed, return is made to the step S12, and if not so, return is made to the step S1 of FIG. 7. When at the step S14, the shutter 31 is fully opened by the shutter portion 10a with the shutter release, the synchro contact Sx is closed to make the flash device 2 start light emission. At the subsequent step S15, the divisional light receiving element 11 is controlled through the light modulation circuit 12, and the light from the object reflected by the surface of the film 32 is metered. At a step S16, the photometric output of the divisional light receiving element 11 is weighted in each photometry area, and whether the integrated value of the sum of the weighted photometric values has reached the TTL light amount level set at said step is discriminated, and if it has reached that TTL light amount level, advance is made to a step S17, where a light emission stopping signal FS is sent from the light modulation circuit 12 to the flash device 2 to thereby stop light emission. Thereafter, return is made to the step S1 of FIG. 7.

As described above, provision is made of the divisional light receiving element 11 for dividing the object field into a plurality of areas and metering the reflected light from the object during flash emission and design is made such that weighting is effected in each area of the devisional light receiving element 11 in conformity with the selected image mode and the light modulation control of the flash device 2 is effected on the basis of the photometric value of each weighted photometry area and therefore, proper exposure is obtained for the main object during flash photographing.

Design is also made such that an optimal TTL light amount level is set in conformity with the selected image mode and the light emission of the flash device 2 is stopped when the photometric value of the divisional light receiving element 11 reaches this TTL light amount level and therefore, proper exposure is likewise obtained for the main object.

Description will now be made of another embodiment provided with an AF response mode in which light modulation control is effected in response to an AF device. In this embodiment, the flash modulation control apparatus shown in FIG. 4 and the camera shown in FIG. 6 are used with the exception that a divisional light receiving element 41 shown in FIG. 9 is used in lieu of the divisional light receiving element 11 shown in FIG. 5 and therefore, the description of them is omitted.

Figure 9:
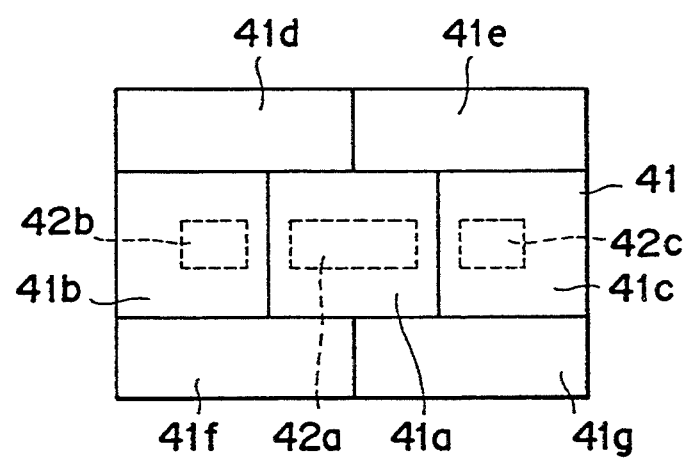
FIG. 9 shows another example of the divisional light receiving element.

FIG. 9 shows the relations between the divisional light receiving element 41 for dividing the photographing image field into seven areas and metering these areas and three focus detection areas 42a–42c in the photographing image field. A light receiving element 41a for the central area corresponds to the focus detection area 42a, a light receiving element 41b corresponds to the focus detection area 42b, and a light receiving element 41c corresponds to the focus detection area 42c. During the photographing by the AF response mode, weighting is preponderantly effected to a photometry area corresponding to that focus detection area in which the main object seems to lie, and light modulation control is effected on the basis of the weighted photometric value and therefore, proper exposure is obtained for the main object.

Figure 10:
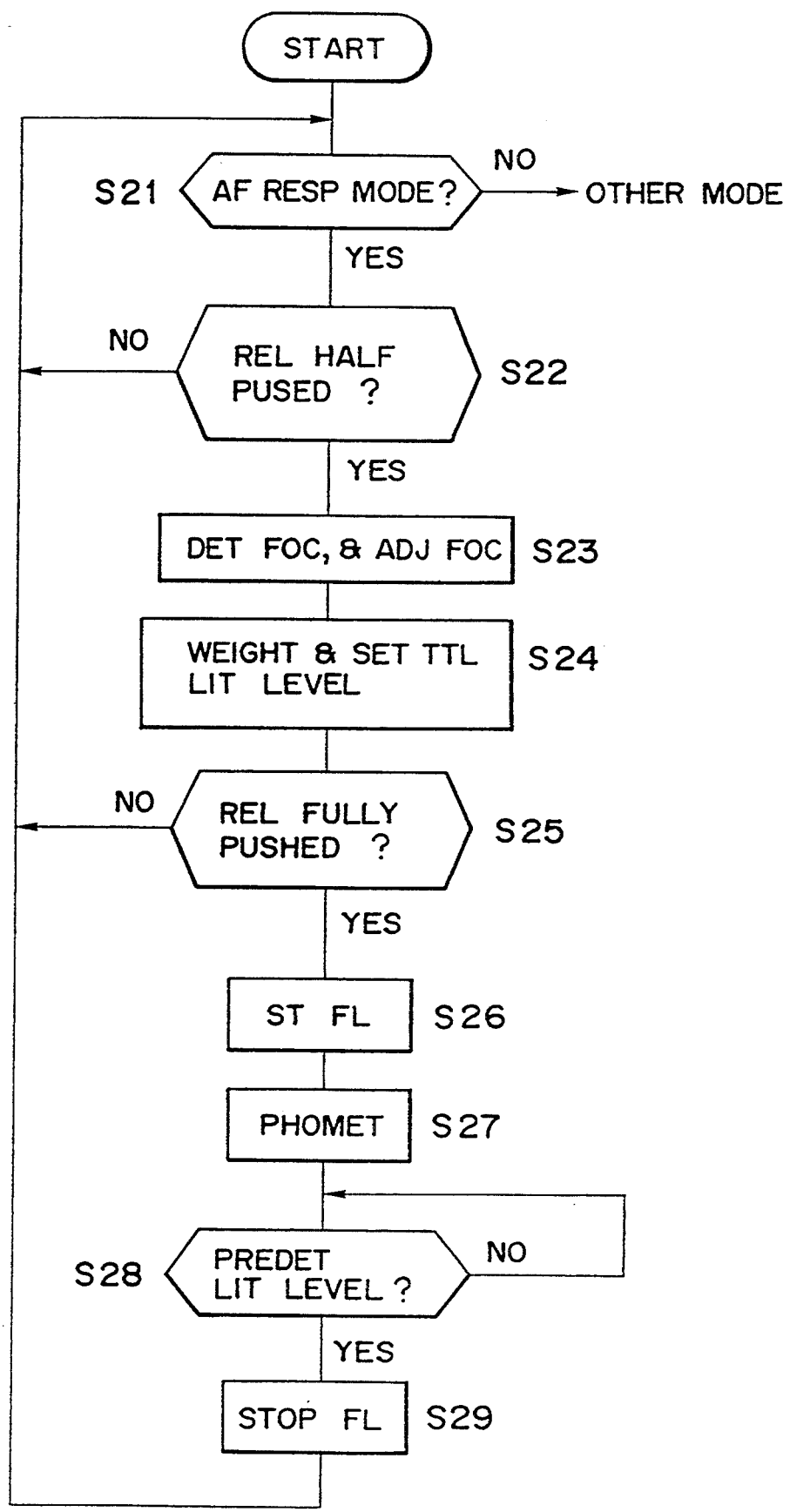
FIG. 10 is a flow chart showing the light modulation control program of another embodiment.

FIG. 10 shows a light modulation control program during the AF response mode which is executed by the control circuit 1. The operation of the present embodiment will hereinafter be described with reference to FIG. 10.

At a step S21, whether the AF response mode is selected by the image mode selecting circuit 5 is discriminated, and if it is selected, advance is made to a step S22, and if not so, advance is made to the process routine of other mode. The description of the other mode is omitted. At the step S22, whether the shutter release button is half-pushed is discriminated, and if it is half-pushed, advance is made to a step S23, and if not so, return is made to the step S21. At the step S23, focus detection is effected in the focus detection areas 42a, 42b and 42c shown in FIG. 9 by the focus detecting circuit 9 and the AF motor driving circuit 13 is controlled on the basis of the results of those detections to thereby move the photo-taking lens.

At a step S24, a photometry area and a TTL light amount level are set on the basis of the results of the detections. For example, when a defocus amount indicative of the closest distance is detected in the area 42a, the weight of the area of the light receiving element 41a is set to 1.0 and the weights of the other areas are set to 0. Also, when a defocus amount indicative of the closest distance is detected in the area 42b, the weight of the light receiving element 41b is set to 0.5, the weights of the areas of light receiving elements 41d and 41f are set to 0.25 and the weights of the other areas are set to 0. Further, when a defocus amount indicative of the closest distance is detected in the area 42c, the weight of the area of the light receiving element 41c is set to 0.5, the weights of the areas of light receiving elements 41e and 41g are set to 0.25 and the weights of the other areas are set to 0. A predetermined standard value is adopted as the TTL light amount level without correction being effected.

At a step S25, whether the shutter release button is fully pushed is discriminated by means of the switch 4, and if it is fully pushed, advance is made to a step S26, and if not so, return is made to the step S21. When at the step S26, the shutter 31 is fully opened by the shutter portion 10a with shutter release, the synchro contact Sx is closed to thereby make the flash device 2 start light emission. At the subsequent step S27, the divisional light receiving element 41 is controlled through the light modulation circuit 12 and the light from the object reflected by the surface of the film 32 is metered. At a step S28, the photometric output of the divisional light receiving element 41 is weighted in each photometry area, and whether the integrated value of the sum of the weighted photometric values has reached a predetermined TTL light amount level is discriminated, and if it has reached the predetermined TTL light amount level, advance is made to a step S29, where a light emission stopping signal FS is sent from the light modulation circuit 12 to the flash device 2 to thereby stop light emission. Thereafter, return is made to the step S21.

As described above, design is made such that weighting is effected in each area of the divisional light receiving element 41 on the basis of the result of the detection by the focus detecting circuit 9 and the light modulation control of the flash device 2 is effected on the basis of these weighted photometric values and therefore, proper exposure is obtained for the main object during flash photographing.

The number of division of the area of the divisional light receiving element for metering the reflected flashlight from the object in each of a plurality of divided areas and the dividing method are not restricted to the above-described embodiments, but any number of divisions and any dividing method may be adopted. The set positions of the focus detection areas are neither restricted to the above-described embodiments.

In the construction of the above-described embodiments, the control circuit 1 and the light modulation circuit 12 constitute light modulation control means 101, 101A, 101B, the image mode selecting circuit 5 constitutes photographing mode setting means 102, 102A, the divisional light receiving element 11, 41 constitutes divisional photometry means 103, 103A, the control circuit 1 constitutes weighting means 104, 104A and optimal light amount level setting means 105, and the focus detecting circuit 9 constitutes focus detecting means 106.

As described above, according to the present invention, provision is made of divisional photometry means for dividing the object field into a plurality of areas and metering reflected light from the object during flash emission and design is made such that weighting is effected to each area of the divisional photometry means in conformity with a selected photographing mode and the light modulation control of the flash device is effected on the basis of the photometric values of each weighted photometry area and therefore, proper exposure is obtained for the main object during flash photographing.

Also, according to the present invention, design is made such that optimal TTL light amount levels are set in conformity with selected photographing modes and the light emission of the flash device is stopped when the photometric value of the photometry means reaches those light amount levels and therefore, proper exposure is likewise obtained for the main object during flash photographing.

Further, according to the present invention, design is made such that weighting is effected to each area of the divisional photometry means during flash photographing on the basis of the result of the focus detection by focus detecting means and the light modulation control of the flash device is effected on the basis of these weighted photometric values and therefore, proper exposure is obtained for the main object during flash photographing.

What is claimed is:

1. A flash modulation control apparatus in a camera having a photo-taking lens and a flash device mounted thereon, comprising:

photographing mode setting means for setting a photographing mode in which optimal exposure is obtained in conformity with an object;

photometry means for metering through said photo-taking lens light emitted from said flash device and reflected by the object, and outputting a photometric value;

optimal light amount level setting means for setting an optimal light amount level in conformity with the photographing mode set by said photographing mode setting means; and light modulation control means for stopping the light emission of said flash device when the photometric value of said photometry means reaches said optimal light amount level.

2. A flash modulation control apparatus according to claim 1, wherein when said photographing mode is the fantasy mode, said optimal light amount level setting means sets said optimal light amount level to a value during ordinary photographing.

3. A flash modulation control apparatus according to claim 1, wherein when said photographing mode is the wedding mode, said optimal light amount level setting means sets said optimal light amount level to a value higher than a value during ordinary photographing.

4. A flash modulation control apparatus according to claim 1, wherein when said photographing mode is the balance synchro spot mode, said optimal light amount level setting means sets said optimal light amount level to a value lower than a value during ordinary photographing.

5. A camera photographing with a flashing device, comprising:

a photographing mode setting member provided at an outer cover of said camera for selecting a photographing mode in response to an external manipulation, in which an optimum exposure is obtained in accordance with an object;

a photometry circuit including a photometry element, for photometering reflected light from the object and outputting a photometry output;

an optimal light amount level setting processor for receiving a setting signal of said photographing mode setting member, and setting an optimum light amount level in accordance with the photographing mode set by said photographing mode setting member; and a light modulation control processor for receiving the photometric output from said photometry circuit, and terminating an emission of said flashing device when a value of the photometry output from said photometry circuit becomes equal to the optimum light amount level.

6. A camera photographing with a flashing device, comprising:

a photographing mode setting member provided at an outer cover of said camera for selecting a photographing mode in response to an external manipulation, in which an optimum exposure is obtained in accordance with an object;

a photometry circuit including a photometry element, for photometering reflected light from the object through a photographing lens and outputting a photometry output;

an optimal light amount level setting processor for receiving a setting signal of said photographing mode setting member, and setting an optimum light amount level in accordance with the photographing mode set by said photographing mode setting member; and a light modulation control processor for receiving the photometric output from said photometry circuit, and terminating an emission of said flashing device when a value of the photometry output from said photometry circuit becomes equal to the optimum light amount level.

* * * * *